(12) United States Patent
Karsenti et al.

(10) Patent No.: US 9,183,624 B2
(45) Date of Patent: Nov. 10, 2015

(54) DETECTING DEFECTS ON A WAFER WITH RUN TIME USE OF DESIGN DATA

(71) Applicant: KLA-Tencor Corporation, Milpitas, CA (US)

(72) Inventors: Laurent Karsenti, Rehovot (IL); Brian Duffy, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 14/303,602

(22) Filed: Jun. 13, 2014

(65) Prior Publication Data

US 2014/0376801 A1   Dec. 25, 2014

Related U.S. Application Data

(60) Provisional application No. 61/837,066, filed on Jun. 19, 2013.

(51) Int. Cl.
*G06K 9/00* (2006.01)
*G06T 7/00* (2006.01)

(52) U.S. Cl.
CPC ....... *G06T 7/001* (2013.01); *G06T 2207/10061* (2013.01); *G06T 2207/30148* (2013.01)

(58) Field of Classification Search
CPC ..................... G06T 7/001; G06T 2207/10061; G06T 2207/30148; G06T 2207/30141; G06T 2207/30152; G01N 21/9501
See application file for complete search history.

(56) References Cited

U.S. PATENT DOCUMENTS

| | | | |
|---|---|---|---|
| 7,570,796 B2 | 8/2009 | Zafar et al. | |
| 7,676,077 B2 | 3/2010 | Kulkarni et al. | |
| 7,796,801 B2 * | 9/2010 | Kitamura et al. | 382/141 |
| 7,877,722 B2 | 1/2011 | Duffy et al. | |
| 7,912,658 B2 | 3/2011 | Biellak et al. | |
| 8,041,103 B2 | 10/2011 | Kulkarni et al. | |
| 8,126,255 B2 | 2/2012 | Bhaskar et al. | |
| 8,284,394 B2 | 10/2012 | Kirk et al. | |
| 8,422,010 B2 | 4/2013 | Kirk et al. | |
| 8,494,802 B2 | 7/2013 | Chen et al. | |
| 2004/0228516 A1 * | 11/2004 | Golan et al. | 382/147 |
| 2013/0336573 A1 * | 12/2013 | Dalla-Torre et al. | 382/145 |
| 2014/0241610 A1 | 8/2014 | Duffy et al. | |

* cited by examiner

*Primary Examiner* — Brian Le
(74) *Attorney, Agent, or Firm* — Ann Marie Mewherter

(57) ABSTRACT

Methods and systems for detecting defects on a wafer are provided. One method includes creating a searchable database for a design for a wafer, which includes assigning values to different portions of the design based on patterns in the different portions of the design and storing the assigned values in the searchable database. Different portions of the design having substantially the same patterns are assigned the same values in the searchable database. The searchable database is configured such that searching of the database can be synchronized with generation of output for the wafer by one or more detectors of a wafer inspection system. Therefore, as the wafer is being scanned, design information for the output can be determined as fast as the output is generated, which enables multiple, desirable design based inspection capabilities.

94 Claims, 2 Drawing Sheets

DETECTING DEFECTS ON A WAFER WITH RUN TIME USE OF DESIGN DATA

BACKGROUND OF THE INVENTION

1. Field of the Invention

The present invention generally relates to methods and systems for detecting defects on a wafer with run time use of design data.

2. Description of the Related Art

The following description and examples are not admitted to be prior art by virtue of their inclusion in this section.

An integrated circuit (IC) design may be developed using a method or system such as electronic design automation (EDA), computer aided design (CAD), and other IC design software. Such methods and systems may be used to generate the circuit pattern database from the IC design. The circuit pattern database includes data representing a plurality of layouts for various layers of the IC. Data in the circuit pattern database may be used to determine layouts for a plurality of reticles. A layout of a reticle generally includes a plurality of polygons that define features in a pattern on the reticle. Each reticle is used to fabricate one of the various layers of the IC. The layers of the IC may include, for example, a junction pattern in a semiconductor substrate, a gate dielectric pattern, a gate electrode pattern, a contact pattern in an interlevel dielectric, and an interconnect pattern on a metallization layer.

The term "design data" as used herein generally refers to the physical design (layout) of an IC and data derived from the physical design through complex simulation or simple geometric and Boolean operations.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive.

Recently, methods and systems have been developed to maximize the sensitivity of the inspection system to capture subtle spatially systematic "design-for-manufacturability" (DFM) defects resulting from design and process interdependencies by using some sort of design information for the wafer being inspected in the inspection process. By not using design information to its fullest advantage, it can take a longer time to get processes, product design, and reticles under control.

Accordingly, it would be advantageous to develop systems and methods for detecting defects on a wafer that do not have one or more of the disadvantages described above.

SUMMARY OF THE INVENTION

The following description of various embodiments is not to be construed in any way as limiting the subject matter of the appended claims.

One embodiment relates to a method for detecting defects on a wafer. The method includes creating a searchable database for a design for a wafer. Creating the searchable database includes assigning values to different portions of the design based on patterns in the different portions of the design and storing the assigned values in the searchable database. The different portions of the design having substantially the same patterns are assigned the same values in the searchable database. The method also includes scanning the wafer with a wafer inspection system. One or more detectors of the wafer inspection system generate output for the wafer during the scanning. While the scanning is being performed, the method includes searching the searchable database for patterns in the output. The searching is synchronized with generation of the output for the wafer by the wafer inspection system. In addition, the method includes determining values for different portions of the output as the values assigned to the different portions of the design having the patterns that substantially match the patterns in the output. The method further includes detecting defects on the wafer by applying one or more defect detection algorithms to the output based on the values assigned to the different portions of the output. Creating the searchable database, searching the searchable database, determining the values, and detecting the defects are performed with one or more computer systems.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for detecting defects on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to detect defects on a wafer. The system includes one or more computer subsystems configured for creating a searchable database for a design for a wafer. Creating the searchable database includes assigning values to different portions of the design based on patterns in the different portions of the design and storing the assigned values in the searchable database.

The different portions of the design having substantially the same patterns are assigned the same values in the searchable database. The system also includes an optical subsystem configured for scanning the wafer. One or more detectors of the optical subsystem generate output for the wafer during the scanning. The one or more computer subsystems are also configured for, while the scanning is being performed, searching the searchable database for patterns in the output. Searching the searchable database is synchronized with generation of the output for the wafer by the optical subsystem. The computer subsystem(s) are further configured for determining values for different portions of the output as the values assigned to the different portions of the design having the patterns that substantially match the patterns in the output. In addition, the computer subsystem(s) are configured for detecting defects on the wafer by applying one or more defect detection algorithms to the output based on the values assigned to the different portions of the output. Each of the embodiments of the system described above may be further configured as described further herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
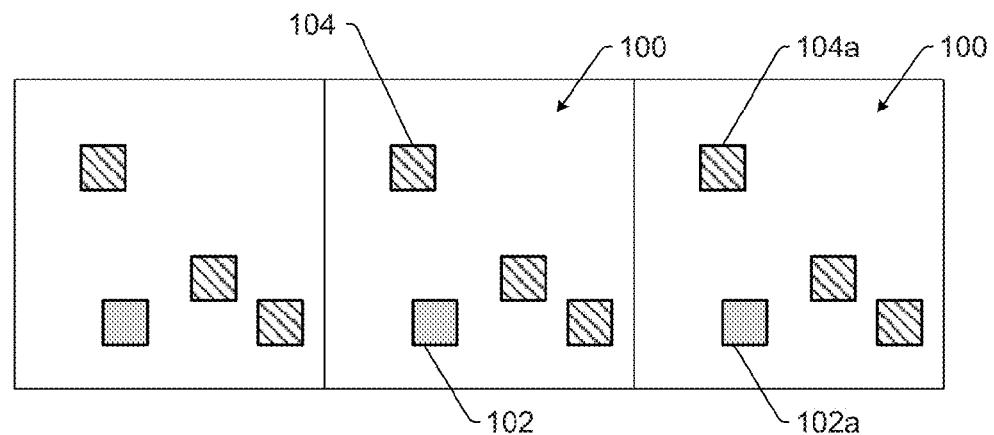
FIG. 1 is a schematic diagram illustrating one embodiment of a plan view of several dies on a wafer in which different portions of a design for the wafer have been formed.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by semiconductor device designer in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a method for detecting defects on a wafer. The embodiments described herein are generally configured for run time inspection bootstrapping for detection of systematic and random defects. "Run time inspection bootstrapping" as that term is used herein can be generally defined as, during data acquisition and disposition during an inspection process, performing a self-sustaining process that proceeds without external input. For example, the embodiments described herein may be used for inspection runtime bootstrapping of sensitivity-related parameters of the inspection with the intent of detecting defects that would otherwise go undetected. In addition, during inspection of a semiconductor wafer, systems and methods developed by KLA-Tencor, Milpitas, Calif., have the capability to identify locations with (nearly) identical patterns (for example, using design based grouping (DBG)). In addition, systems and methods developed by KLA-Tencor have the ability to selectively improve defect detection sensitivity in localized regions through the use of Nanopoint (methods and systems for aligning inspection output to design data with substantially high accuracy (e.g., subpixel)), including switching detection algorithms. The embodiments described herein make possible these and other capabilities by incorporating ultrafast pattern search capabilities based on database indexing into the detection flow. These and other wafer inspection improvements are made possible by the ultrafast pattern search capabilities described further herein.

The embodiments described herein leverage (and are dependent upon) a substantially fast integrated circuit (IC) physical design pattern search engine. The pattern search engine or a computer subsystem described further herein performs a data preparation step that optimizes the database indexing such that searches of the database can be synchronized in concert with the inspection tool swathing/scanning/stepping process. For example, the method includes creating a searchable database for a design for a wafer. Creating the searchable database includes assigning values to different portions of the design based on patterns in the different portions of the design and storing the assigned values in the searchable database. The different portions of the design having substantially the same patterns are assigned the same values in the searchable database. For example, an index table may be prepared in advance for ultrafast pattern searching in which all identical neighborhood signatures have been calculated.

In one embodiment, creating the searchable database includes applying a geometric hashing method to the design. The geometric hashing method may include any suitable such method known in the art. Creating the searchable database prior to any inspection processes performed on the wafer pushes a significant amount of the computation time from the search time (the time during the wafer inspection process when searching of the database is performed) back to the time in which the database is being constructed. More specifically, by performing an exhaustive search of the design for substantially similar patterns, the search is performed during the building of the inverted index, not during use of the database at search time, so queries of the database can be substantially fast (i.e., at least as fast as the output is generated for the wafer by the wafer inspection system during scanning of the wafer such that searching of the database can be synchronized with generation of the output and/or other processes or functions performed in synchronicity with the output generation).

The method also includes scanning the wafer with a wafer inspection system. The wafer inspection system may be further configured as described herein. Scanning the wafer with the wafer inspection system may be performed in any suitable manner (e.g., directing light to the wafer and as the light is scanned over the wafer, detecting light from the wafer as a result of the illumination). One or more detectors of the wafer inspection system generate output for the wafer during the scanning. The detector(s) may be further configured as described herein. The output generated for the wafer may include any suitable output of detectors of wafer inspection systems such as signals, signal data, images, image data, etc.

The method further includes, while the scanning is being performed, searching the searchable database for patterns in the output. The searching is synchronized with generation of the output for the wafer by the wafer inspection system. In this manner, during a wafer scan, the signal (gray level) or other output of the detector(s) can be monitored by tracking the exact design arrangement at the location of data collection. In addition, as described further herein, the indexing of the physical design database can be optimized to synchronize searching with functions performed by a wafer inspector. Synchronizing the design database searching with the wafer inspector functions may advantageously enable a number of different applications. For example, the design database can be searched and care areas can be injected at least one swath ahead of the wafer scan (real or virtual). Although the searching can be synchronized with the scanning of the wafer, the synchronization can be done independently of the scanning. In the virtual inspector variation described further herein, the design to optical alignment can be done as a post-scanning operation.

The method also includes determining values for different portions of the output as the values assigned to the different portions of the design having the patterns that substantially match the patterns in the output. For example, once the design patterns in the different portions of the output have been found in the searchable database, the values for those design patterns can be assigned to the different portions of the output. One or more functions or steps of the method may then be performed as described further herein based on the values assigned to the different portions of the output. In addition, since different portions of the output will be assigned different values, the functions or steps may be selectively performed on the different portions based on the different values.

The method further includes detecting defects on the wafer by applying one or more defect detection algorithms to the output based on the values assigned to the different portions of the output. Applying the defect detection algorithm(s) to the output may be performed in a number of different ways described further herein and in any other suitable manner known in the art. In addition, applying the defect detection algorithm(s) to the output may be performed using any method, algorithm, function, data structure, etc. known in the art of data, signal, or image processing. Creating the searchable database, searching the searchable database, determining the values, and detecting the defects are performed with one or more computer systems, which may be configured as described further herein.

In one embodiment, applying the one or more defect detection algorithms includes performing statistical analysis on the different portions of the output having the same assigned values. For example, a searchable database (or index table) created as described herein may be used to group all pixel coordinates associated with some substantially similar design geometric arrangement. In other words, the index table may be used to map all equivalent pixels captured by one or more detectors of the wafer inspection system (pixels landing on the same geometric hash value). Statistical analysis may then be performed on data (pixels) collected from identical (or nearly identical) design arrangements. In other words, for each hash value, a statistic (e.g., average and/or standard deviation) may be determined for equivalent pixels. In one such example, for each group, a statistic on collected pixel values (such as average, standard deviation, etc.) may be determined. Outlier pixels may then be determined as corresponding to defect candidates. The defect detection may be further performed as described herein and has many benefits described further herein. For example, the defect detection may be performed on substantially homogenous areas thereby increasing the signal-to-noise (e.g., outlier pixel versus average). In this manner, design information may be used as described herein to characterize and increase signal-to-noise during defect detection.

In another embodiment, applying the one or more defect detection algorithms includes determining a statistic for the different portions of the output. Such an embodiment also includes detecting defects in the different portions of the output based on the statistics. These steps may be performed as described above. Such an embodiment further includes, for one of the different portions of the output in which one of the defects was detected, generating a first comparing result by comparing the statistic for the one different portion to the statistics for one or more of the different portions of the output generated within the same die as the one different portion and having the same assigned values as the one different portion. In addition, the embodiment includes generating a second comparing result by comparing the statistic for the one different portion to the statistics for one or more other of the different portions of the output generated in one or more dies other than the die in which the one different portion was generated and having the same assigned values as the one different portion. The embodiment further includes determining a defect type for the one of the defects based on the first and second comparing results in combination.

In one such example, for each outlier found, a cross check may be performed in which an internal die comparison, $C_{int}$, and an adjacent die comparison, $C_{adj}$, are performed. In the internal die comparison, the statistic for the outlier may be compared with the statistics for one or more other of the different portions generated in the same die as the output for the outlier and that have the same or substantially the same design patterns formed therein. In the cross-die comparison, the statistic for the outlier may be compared with the statistics for one or more other of the different portions generated in different dies as the output for the outlier and that have the same or substantially the same design patterns formed therein.

To illustrate this process further, FIG. 1 shows three dies 100 that may be formed on a wafer. Although three dies are shown in FIG. 1, any number of dies in any arrangement may be formed on a wafer. No patterns that are formed in the dies and may be imaged in output generated by a wafer inspection system are shown in FIG. 1 for the sake of simplicity. Areas 102 and 102a shown in FIG. 1 are areas in the dies in which portions of the design having substantially the same patterns are formed in different dies at substantially the same within die locations. Areas 102 and 104 shown in FIG. 1 are areas in one of the dies in which portions of the design having substantially the same patterns are formed at different within die locations. In addition, areas 102a and 104a shown in FIG. 1 are areas in another one of the dies in which portions of the design having substantially the same patterns are formed at different within die locations. Therefore, in some instances, output for areas 104 may be used to estimate noise for one or more of area 102 and areas 104. In addition, the noise determined in such a manner may be used to detect defects in one or more of area 102 and areas 104. If an outlier is detected in area 102, then the output for area 102 may be compared to the output for one or more of areas 104 to perform a within die comparison thereby generating a value for $C_{int}$. For such an outlier, the output for area 102 may be compared to the output for area 102a to perform a external die comparison thereby generating a value for $C_{adj}$. Similar comparisons may be performed for any or all of the other outliers detected on the wafer.

$C_{int}$ and $C_{adj}$ may then be used in combination to determine if the detected outlier is a process variation, a random defect, a reticle defect, or not a defect. For example, if $C_{adj}$ is substantially greater than 0 (i.e., $C_{adj} \gg 0$) and $C_{int}$ is roughly equal to 0 (i.e., $C_{int} \approx 0$), then the outlier may be classified as a process variation. In addition, if $C_{adj}$ is substantially greater than 0 (i.e., $C_{adj} \gg 0$) and $C_{int}$ is substantially greater than 0 (i.e., $C_{int} \gg 0$), then the outlier may be classified as a random defect. On the other hand, if $C_{adj}$ is roughly equal to 0 (i.e., $C_{adj} \approx 0$) and $C_{int}$ is substantially greater than 0 (i.e., $C_{int} \gg 0$), then the outlier may be classified as a reticle manufacturing or reticle data preparation related defect. Furthermore, if $C_{adj}$ is roughly equal to 0 (i.e., $C_{adj} \approx 0$) and $C_{int}$ is roughly equal to 0 (i.e., $C_{int} \approx 0$), then the outlier may be classified as a non-defect.

In one embodiment, the method includes determining a noise measure for at least one area on the wafer using the output for two or more areas on the wafer having substantially the same patterns formed therein. In one such embodiment, the at least one area and the two or more areas are located in the same die on the wafer at different within die locations. In another such embodiment, the method further includes determining a non-defect related characteristic of the wafer based on the determined noise measure. For example, in some instances, in addition to using defect detection algorithms to decide whether a specified location is a defect or not, the system can simply record attributes (e.g., "noise measures," which may be calculated as described above) for specified locations on the wafer without categorizing the location as a defect or not. This is analogous to using the wafer inspection system for metrology, examples of which are described in U.S. Pat. No. 7,912,658 issued Mar. 22, 2011 to Biellak et al., U.S. Pat. No. 8,284,394 issued Oct. 9, 2012 to Kirk et al., U.S. Pat. No. 8,422,010 issued Apr. 16, 2013 to Kirk et al., and U.S. Pat. No. 8,494,802 issued Jul. 23, 2013 to Chen et al., which are incorporated by reference as if fully set forth herein. The embodiments described herein may be further configured as described in these patents. The non-defect related characteristic can be any wafer characteristic that is normally determined by a metrology system such as roughness.

Figure 2:
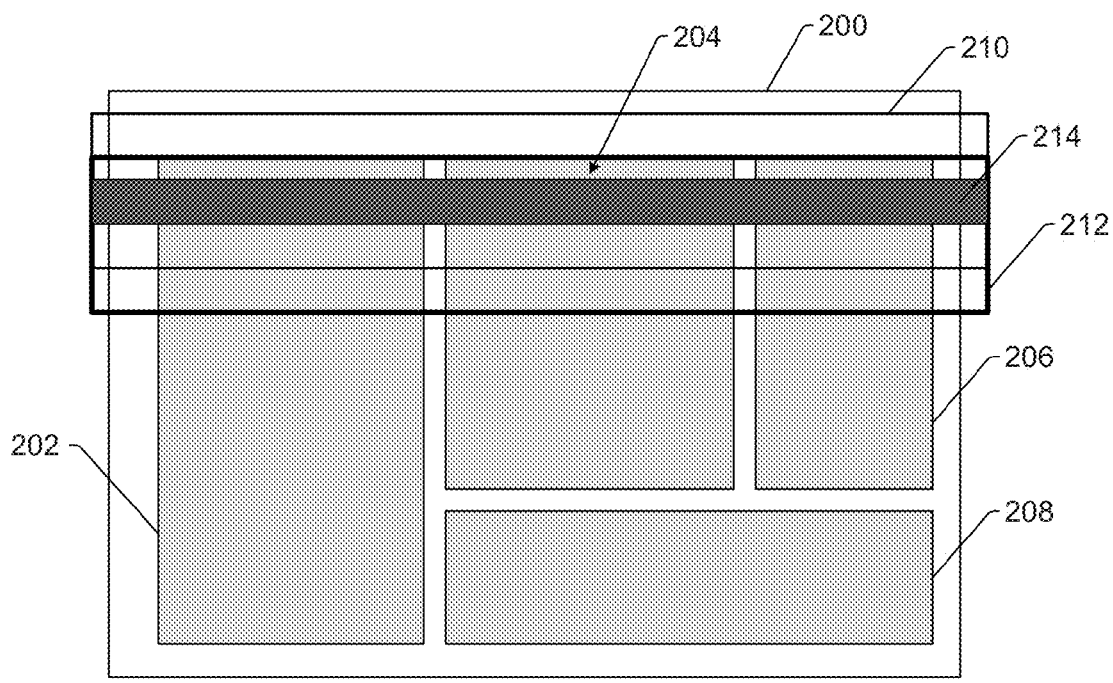
FIG. 2 is a schematic diagram illustrating one embodiment of different portions of a design for a wafer, a swath of output that may be generated for the wafer by a wafer inspection system, and different sub-bands of the different portions that can be used for the swath.

In some instances, only a portion of the searchable database may be provided to the wafer inspection system at any given time. For example, to minimize memory consumption and disk access time, the complete file for the searchable database may be divided into sub-reticle bands with an overlap corresponding to the swath height. That way, any swath context may be indexed in a contiguous index table. In one such embodiment, as shown in FIG. 2, during creation of the searchable database, die 200 may have been separated into different portions 202, 204, 206, and 208 based on the patterns in the areas of the dies corresponding to the different portions. For example, each of the different portions shown in FIG. 2 may have patterns in the design that are substantially different from each other. In other words, portion 202 may have first patterns formed therein, portion 204 may have second patterns formed therein, portion 206 may have third patterns formed therein, portion 208 may have fourth patterns formed therein, and the first, second, third, and fourth patterns may be different than each other. The file for this searchable database may then be divided into sub-reticle bands, of which two are shown in FIG. 2, namely: sub-reticle bands 210 and 212. As shown in FIG. 2, the sub-reticle bands may overlap with respect to each other such that some portion of sub-reticle band 210 is included in sub-reticle band 212 and vice versa. The extent to which the sub-reticle bands overlap may be at least as great as the swath height. For example, as shown in FIG. 2, one swath of output for the wafer may be swath 214, and the entire swath may be located within the portions of the two sub-reticle bands that overlap. In this manner, regardless of the location of the swath of data with respect to the sub-reticle bands, only one sub-reticle band of the searchable database may be needed for any given swath. The preparation of the searchable database may be explicitly designed to be compatible with the data flow within the inspection system. This is loosely analogous to the CBI RTCM (run time context map) generation or KLA-Tencor Reticle Inspection system "data prep" for design based inspection.

In an additional embodiment, applying the one or more defect detection algorithms includes determining a value for a first characteristic of one of the defects based on the different portions of the output generated within a single die on the wafer and a value for a second characteristic of the one defect based on the different portions of the output generated in different dies on the wafer and determining if the one defect is a process variation defect, random defect, or systematic defect based on the values for the first and second characteristics. For example, a defect grade can be calculated within a single die or between adjacent dies making possible the distinction between process variation, random defects, and reticle defects. Therefore, the embodiments described herein provide a methodology for automatic defect root cause classification of systematic, random, reticle, and process variation type defects.

In a further embodiment, applying the one or more defect detection algorithms includes determining a statistic for the defects detected in the different portions of the output having one of the assigned values and determining if the defects are systematic defects based on the statistic. Such systematic defect discovery may be performed in real time (i.e., as the wafer inspection system is generating output for the wafer). For example, once a swath of output is processed, the list of defect locations may be augmented with the corresponding hash values (which may be stored, for example, as a computer word). Once all the defects have been processed, the statistic for the hash values may be calculated as follows:

$$\text{Criteria for systematic defect: } \frac{n_i}{N} \gg \frac{S \times O_i}{A}$$

Systematic Factor(defect attribute):

$$\frac{S \times O_i \times N}{n_i \times A} \text{(Random—0, Systematic 1)}$$

where $n_i$ is the number of defects found with the hash value HashV$_i$, $O_i$ is the total occurrence of the scanned area (A) calculated with the fast pattern search, S is the area encompassed during the geometric hashing to calculate the hash value, and N is the total number of detected defects. The systematic factor can be used in combination with DBG grouping (hot spot normalization by structure frequency).

As described above, the defect detection may be performed based on the values assigned to the different portions of the design. Therefore, the defect detection (and other steps described herein) may use information about the patterns formed in the different portions of the design as an input to a calculation, function, algorithm, etc. However, as will be described further herein, the values assigned to the different portions of the design may also or alternatively be used to control how one or more steps of the method are performed. For example, the values assigned to the different portions of the design may be determined using the searchable database, and then those assigned values may be used to control one or more steps on portions of the wafer or portions of the output generated for the wafer.

In some embodiments, assigning the values includes assigned predetermined values to the different portions of the design in which process variation is substantially higher than other portions of the design. The portions of the design having substantially high process variation can be determined in any suitable manner (e.g., by scanning the design patterned on a wafer and measuring noise, which can be an indication of process variation, based on historical data gathered for similar patterns in the design formed on similar wafers, based on a priori knowledge of the process/design interaction). The term "process variation" as used herein is different than "defects" that may be detected on the wafer in that the process variations may cause noise on the wafer that may interfere with the detection of defects. Noise estimation calculated for different portions of the design can be useful to adapt the detection mechanism to different areas of the wafer (adaptive thresholding) and to improve the distinction between real and nuisance defects.

In one such embodiment, applying the one or more defect detection algorithms includes applying the one or more defect detection algorithms to only the different portions of the output to which the predetermined values have not been assigned. In this manner, defect detection may not be performed in portions of the design that have substantially high process variation. In other words, if a portion of the design is assigned a value that indicates that it has substantially high process variation, then defect detection may not be performed in areas of the wafer in which that design portion is formed. As such, relatively noisy areas of the wafer can be excluded from the defect detection step.

In another such embodiment, scanning the wafer includes scanning only portions of the wafer corresponding to the different portions of the design to which the predetermined values have not been assigned. In this manner, noisy structures (arrangement for which the process variation is substantially large) can be eliminated from the scanning area.

In one embodiment, assigning the values includes scanning the wafer or another wafer in a recipe setup scan performed with the wafer inspection system to generate additional output for the wafer or the other wafer with the one or more detectors of the wafer inspection system, determining values for different portions of the additional output as the values assigned to the different portions of the design having the patterns that substantially match the patterns in the additional output, and associating noise levels in the different portions of the additional output with the values of the different portions of the design assigned to the different portions of the additional output. For example, during a first wafer scan (performed during recipe setup), the noise level measured by one or more detectors of the inspection system may be associated to the hash value of the equivalent pixels. The equivalent pixels are pixels of the detector(s) that are imaging a common geometry described by a specific hash value.

In one such embodiment, the method includes determining care areas for the wafer based on the noise levels associated with the values of the different portions of the design. For example, a list of the hash values for which the noise levels are low may be used to define the care areas for later inspection. Alternatively, a list of hash values for which the noise level is high may be used to define a mask for inspection. In this manner, optimized care areas can be derived automatically from the noise analysis performed during the recipe creation. In addition, determining the care areas in this manner may be performed automatically for automatic care area generation. Furthermore, the embodiments described herein can be used to create highly precise care areas that may have substantially small dimensions (which may be referred to as micro care areas (MCAs)). Using substantially small care areas that can be identified within the output generated for a wafer with substantially high precision improves the ability to exclude noise from the care areas thereby improving signal-to-noise and better suppressing nuisance.

In another embodiment, the method includes determining one or more characteristics of defects detected in the different portions of the design having the same values. For example, the embodiments described herein can leverage the DBG grouping feature of KLA-Tencor's design based binning (DBB) capable products. In particular, fast pattern searching can be used to calculate the occurrences of a specific defective structure in the entire design and the severity of a detected printing error can be calculated (which can be used for ranking of the defects by failure rate).

The embodiments described herein may be used to improve the defect detection confidence. In particular, in some embodiments, applying the one or more defect detection algorithms includes comparing the output generated at corresponding locations in different dies. For example, during processing of a swath of output generated for a wafer, a die-to-die inspection may be performed by performing a double pixel subtraction (i.e., output for one area in a test die is used as test output, output for corresponding areas in adjacent dies (one on each side of the test die) is used as reference output, and the different reference output is subtracted separately from the test output thereby generating two subtraction results). Such an embodiment also includes identifying candidate defects based on results of the comparing step. For example, the two subtraction results generated as described above may be compared to a threshold (e.g., a hot threshold, i.e., a threshold that is substantially close to the noise floor of the output generated for the wafer, for a hot detection), and any output having values above the threshold may be identified as candidate defects. The candidate defects may also be detected using any other defect detection algorithm and/or method.

In addition, such an embodiment includes, for one of the candidate defects, determining a detection confidence based on two or more of the different portions of the output having the same assigned values as the different portion of the output in which the one candidate defect was detected. For example, in parallel to the swath processing, the corresponding searchable database (or table index) may be loaded into the computer memory. After a candidate defect has been identified, the method may include design analysis in which a hash value is calculated at the candidate defect location. A fast pattern search of the searchable database may then be performed using the hash value. As a result of the fast pattern search, n replicates of the patterns corresponding to the candidate defect may be found. A subtraction result may then be generated using pixels in the n replicates. The detection confidence for the candidate defect may then be determined as the signal-to-noise value calculated for the candidate defect times the square root of n.

Such an embodiment further includes rejecting or accepting the one candidate defect as an actual defect based on the detection confidence. For example, the detection confidence calculated for the candidate defect may be compared to some predetermined value of the detection confidence. If the calculated detection confidence is above the predetermined value, the candidate defect may be identified as an actual defect. If the calculated detection confidence is below the predetermined value, the candidate defect may be identified as a nuisance or noise (i.e., not an actual defect).

Furthermore, such an embodiment includes altering one or more parameters of scanning the wafer and detecting the defects based on whether the one candidate defect is rejected or accepted. For example, the above described method can be used during tuning of the wafer inspection recipe. In particular, the sensitivity (i.e., the defect detection sensitivity) setup may be optimized based on the number of rejected candidates after comparison with the replicates.

In another embodiment, the method includes generating inspection results for the wafer by associating and storing the assigned values for the different portions of the output in which the defects were detected with information for the defects. For example, once a swath of output is processed, the list of defect locations may be augmented with the corresponding hash values (which may be stored, for example, as a 64 bit number). The inspection results (with the assigned values) may be stored in any suitable data structure, database, file, etc. and in any of the storage media described further herein or any other suitable storage media known in the art.

In an additional embodiment, the values assigned to the different portions of the design indicate if the patterns in the different portions are patterns of interest (POIs). For example, if POIs are known prior to the assignation of the values to the different portions of the design, the portions of the design corresponding to the POIs may be assigned some predetermined value(s). In addition, if the POIs are discovered during wafer inspection, the values assigned to the different portions may be amended (e.g., replaced, changed, augmented) in some manner to indicate that the different portions contain POIs.

In one such embodiment, the method includes altering one or more parameters of scanning the wafer based on if the values assigned to the different portions of the design indicate that the patterns in the different portions are the POIs. For example, if some of the different portions are indicated as containing POIs, that information can be used to identify areas on the wafer in which those different portions of the design are or will be formed. The scanning step may then be performed so that only areas on the wafer in which POIs are formed are scanned, so that areas on the wafer in which POIs are formed are scanned with different parameters than other areas on the wafer, or so that areas on the wafer in which POIs are not formed are not scanned. For example, information about the areas on the wafer in which POIs will and will not be formed can be used to direct the scanning of the wafer.

In another such embodiment, the method includes altering one or more parameters of detecting the defects based on if the values assigned to the different portions of the design indicate that the patterns in the different portions are the POIs. For example, if some of the different portions are indicated as containing POIs, that information can be used to identify areas on the wafer in which those different portions of the design are or will be formed. The detecting step may then be performed so that defect detection is performed only in areas on the wafer in which POIs are formed, so that defect detection in areas on the wafer in which POIs are formed is performed with different parameters than other areas on the wafer, or so that defect detection is not performed for areas on the wafer in which POIs are not formed. For example, information about the areas on the wafer in which POIs will and will not be formed can be used to direct the defect detection step.

In a further such embodiment, the method includes altering one or more parameters of a defect review process performed for the defects detected on the wafer based on if the values assigned to the different portions of the design indicate that the patterns in the different portions are the POIs. For example, if some of the different portions are indicated as containing POIs, that information can be used to identify areas on the wafer in which those different portions of the design are or will be formed. The defect review process may then be performed so that defect review is performed only in areas on the wafer in which POIs are formed, so that defect review in areas on the wafer in which POIs are formed is performed with different parameters than other areas on the wafer, or so that defect review is not performed for areas on the wafer in which POIs are not formed. For example, information about the areas on the wafer in which POIs will and will not be formed can be used to direct the defect review process.

In another embodiment, the method includes determining if the defects detected in the different portions of the design having one of the assigned values are systematic defects and, if the defects are determined to be the systematic defects, designating the patterns in the different portions of the design having the one of the assigned values as POIs. For example, new hot spots (i.e., weak patterns) may be identified as a result of processing the inspection results. In one such example, systematic defects may be discovered in an area of a die that was not designated as containing any hot spots. The systematic defects may, however, indicate that the patterns in which they are detected are weak (i.e., prone to defects). Therefore, those patterns may be identified as new hot spots. Information for the new hot spots may be added to the recipe offline for use in future inspection runs. In addition, this information may be used for other applications described herein (e.g., altering parameter(s) of a defect review process such that the defects in the new hot spots are examined further in review). Using the information for the new hot spots in future inspection runs may result in an improved recipe that can be expected to have a higher capture rate for the targeted systematic defect mechanism and thus a more accurate wafer level signature can be detected, which is helpful for root cause diagnosis of the defects on the wafer.

In another example, DBG may be used to group the different portions of the design having the same values in the searchable database and therefore have substantially the same patterns included therein. DBG can be performed in parallel at run time. Then, the defect detection results for any one group may be compared to some criteria for flagging a bin as a "run time POI." In this manner, the embodiments described herein may be configured for run time pattern search and feed forward to a context based inspection recipe at run time triggered by the discovery of a systematic pattern with DBG at run time. DBG may be further performed as described in commonly owned U.S. Pat. No. 7,570,796 issued on Aug. 4, 2009 to Zafar et al. and U.S. Pat. No. 8,041,103 issued on Oct. 18, 2011 to Kulkarni et al., both of which are incorporated by reference as if fully set forth herein. The embodiments described herein may be further configured as described in these patents.

In one such embodiment, the method includes altering one or more parameters of scanning the wafer based on whether the different portions of the design having the one of the assigned values are designated as the POIs. For example, the information about the POIs may be used for a substantially fast inspector POI search. In one such example, once a DBG bin has been promoted to a "run time POI," a pattern search can be triggered ahead of the inspector swathing.

In another such embodiment, the method includes altering one or more parameters of detecting the defects based on whether the different portions of the design having the one of the assigned values are designated as the POIs. For example, the information about the POIs can be used for run time context map (RTCM) updates. In one such example, the locations of patterns identified during a run time POI search may be injected into the RTCM. In addition, the context map may be updated at run time based on the discovery of systematic defects during the same run. Furthermore, there may be more than one context map for a given wafer, and one or more of the context maps may be updated based on the POIs. For example, the context maps that can be updated as described herein include context maps configured for use in detection algorithms, nuisance filtering algorithms, binning algorithms, other post-processing algorithms, and offline analysis. The defect detection algorithm and its settings may be configured for "run time POIs" in the recipe in advance. If parameter(s) of either or both of the scanning or detecting steps are altered due to the "run time POIs," any changes made to the wafer inspection recipe at run time may be stored such that they can be used in future runs of the same wafer inspection recipe, in other wafer inspection recipes, or in other processes performed on the wafer that was inspected (e.g., defect review). Using a context map for the detecting step and/or any other steps described herein may be further performed as described in commonly assigned U.S. Pat. No. 7,676,077 issued Mar. 9, 2010 to Kulkarni et al. and U.S. Pat. No. 7,877,722 issued Jan. 25, 2011 to Duffy et al., both of which are incorporated by reference as if fully set forth herein. The embodiments described herein may be further configured as described in these patents.

In a further such embodiment, the method includes altering one or more parameters of a defect review process performed for the defects detected on the wafer based on whether the different portions of the design having the one of the assigned values are designated as the POIs. For example, information about the POIs can be used to control a defect review tool such as a scanning electron microscope (SEM) with automatic defect classification (ADC) and associated adaptive sampling.

The embodiments described herein may include any other steps for setting up a context based inspection recipe. For example, the embodiments may include identifying a rule-based segmentation scheme and applying it to the appropriate design layers. In addition, the embodiments may include identification of hot spots from any source and including them in the region definition for the recipe. Setting up the recipe may also include compilation of the care areas into an optimized format that is compatible with the inspection run time process.

The learning rate and cycles of learning for systematic defect mechanisms are core to the development and ramp of semiconductor processes and products. The time from discovery of a systematic (pattern dependent) defect mechanism to an optimized recipe for extracting a wafer level signature of the defect pattern is preferably minimized. Using MCAs and RBMT for this purpose is also preferable. The logical extension of the discovery to recipe optimization process into a run time sequence involves compressing the steps such that they can be triggered and instantiated at run time. This applies equally to systematic nuisance defects (e.g., defects on the reticle determined to be allowable even though they would print on a wafer). The embodiments described herein enable the processes described above to be practically achieved. In particular, the ultrafast design pattern search engines described herein that can keep pace with a wafer inspector enable these processes. The indexing of the database is optimized such that searching of the database is compatible with the run time inspection process.

The embodiments described herein can be used in a number of different applications such as recipe setup experiments, SEM sampling, process window experiments, optical proximity correction (OPC) characterization, adaptive sampling, spatial signature analysis, statistical process control (SPC), process design of experiment (DOE) evaluation, new systematic mechanism discovery, and production recipe adaptation. The embodiments described herein can also be implemented in independent steps without new run time changes on the wafer inspection system.

Although the embodiments are described herein with respect to scanning of a physical wafer with an optical-based wafer inspection system, any of the embodiments described herein may be implemented using a so-called "virtual inspector" such as the systems and methods described in commonly assigned U.S. Pat. No. 8,126,255 issued on Feb. 28, 2012 to Bhaskar et al. and commonly assigned U.S. patent application Ser. No. 14/184,417 filed on Feb. 19, 2014 by Duffy et al., both of which are incorporated by reference as if fully set forth herein. In other words, in some embodiments, the wafer inspection system is configured as a virtual wafer inspection system. In these embodiments, the output of the one or more detectors may be output that was previously generated by one or more detectors of an optical or electron beam wafer inspection system and that is stored in the virtual wafer inspection system, and during the scanning, the virtual wafer inspection may replay the stored output as though the wafer is being scanned. In this manner, scanning the wafer with a virtual wafer inspection system may appear to be the same as though a physical wafer is being scanned with an actual wafer inspection system, while, in reality, the wafer scanning involves simply replaying output for the wafer in the same manner as the wafer may be scanned. The embodiments described herein may be further configured as described in the patent and patent application incorporated by reference above.

The embodiments described herein have the same advantages regardless of whether the wafer inspection system is an actual wafer inspection system or a virtual wafer inspection system. In addition, when the wafer inspection system is a virtual wafer inspection system, there may be a number of additional applications that can be performed using the searchable database described herein. For example, in one embodiment, the method includes querying the virtual wafer inspection system for the output stored in the virtual wafer inspection system at POI locations on the wafer and applying one or more algorithms to the output resulting from the querying. In this manner, as an alternative to scanning a physical wafer, the searchable databases described herein can be used to query a virtual inspector stored image for image patches at the POI locations and executing parameter extraction algorithm(s) on the patches. At the extreme, this approach can be used exhaustively for the whole hash table thereby providing an equivalent result to the others described herein. Nevertheless, there could be use cases where such searchable database uses make sense for a subset of the patterns in the searchable database.

In the embodiments described above, the bootstrapping (and any other inspection-related functions performed on the wafer such as an initial inspection) may be performed using the virtual wafer inspection system. In this case, the physical wafer can be on another piece of equipment such as a defect review tool. Such a virtual wafer inspection system may be further configured for other use cases described in the patent and patent application incorporated by reference above.

In some embodiments, however, the method may be performed using both an actual wafer inspection system and a virtual wafer inspection system. For instance, in one embodiment, while the scanning is being performed, the method includes storing the output in a virtual wafer inspection system, and the output used for the searching step is the output stored in the virtual wafer inspection system. In one such embodiment, while the scanning is being performed, the method also includes detecting defects on the wafer by applying one or more other defect detection algorithms to the output as the output is stored in the virtual wafer inspection system. For example, one implementation is to perform an initial detection on a physical wafer inspection system while the wafer is simultaneously recorded to a virtual wafer inspection system, and the bootstrapping step is performed on the virtual wafer inspection system on the recorded portion of the wafer (which may be still be performed in near real time). In another embodiment, while the scanning is being performed, the method includes storing the output in a virtual wafer inspection system, querying the virtual wafer inspection system for the output stored in the virtual wafer inspection system at POI locations on the wafer, and applying one or more algorithms to the output resulting from the querying. For example, the bootstrapping on the virtual wafer inspection system may be performed as the scanning is being performed (in a scanning mode) or using a patch retrieval approach described further above.

The embodiments of the method described above may be performed by any of the system embodiments described herein. In addition, the embodiments of the methods described above may include performing any step(s) and/or function(s) of any other embodiment(s) described herein.

Figure 3:
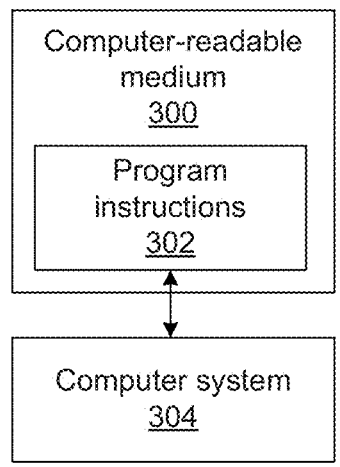
FIG. 3 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects on a wafer. One such embodiment is shown in FIG. 3. In particular, as shown in FIG. 3, non-transitory computer-readable medium 300 includes program instructions 302 executable on computer system 304. The computer-implemented method may include any step(s) of any method(s) described herein.

Program instructions 302 implementing methods such as those described herein may be stored on computer-readable medium 300. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or a networked tool.

An additional embodiment relates to a system configured to detect defects on a wafer. The system includes one or more computer subsystems configured for creating a searchable database for a design for a wafer. Creating the searchable database includes assigning values to different portions of the design based on patterns in the different portions of the design and storing the assigned values in the searchable database. The different portions of the design having substantially the same patterns are assigned the same values in the searchable database. The computer subsystem(s) may be configured to perform these steps as described further herein.

Figure 4:
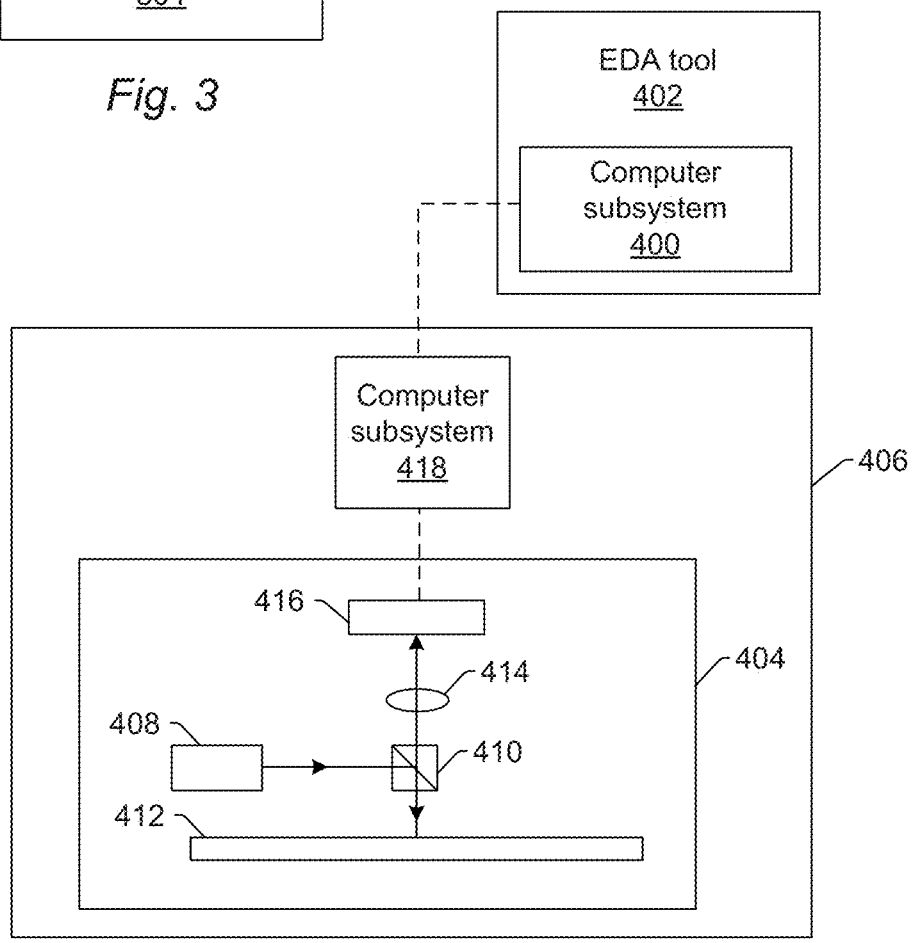
FIG. 4 is a schematic diagram illustrating a side view of an embodiment of a system configured to detect defects on a wafer.

One of the computer subsystem(s) described above may be part of an electronic design automation (EDA) tool, and the optical subsystem described further herein is not part of the EDA tool. For example, as shown in FIG. 4, one of the computer subsystem(s) described above may be computer subsystem 400 included in EDA tool 402. The EDA tool and the computer subsystem included in such a tool may include any commercially available EDA tool that can be configured to perform the steps described above. Therefore, the computer subsystem that creates the searchable database described herein may be separate from a wafer inspection system that is used to inspect the wafer. In other words, the design may be processed by one system or tool to create the searchable database that will be used by another, different system or tool to detect defects. The computer subsystem that is used to create the searchable database also may not be part of an EDA tool and may be included in another system or tool or simply be configured as a stand alone computer system. Furthermore, the tool or computer subsystem that generates the searchable database may be configured to provide that information to the other tool by storing or transferring the searchable database to a shared computer-readable storage medium such as a fab database or by transmitting the searchable database directly to the tool that will use it, which may be performed as described further herein.

The system also includes an optical subsystem configured for scanning the wafer. One or more detectors of the optical subsystem generate output for the wafer during the scanning. One embodiment of such an optical subsystem is shown in FIG. 4 as optical subsystem 404 of wafer inspection system 406. The optical subsystem is configured for scanning the wafer with light and detecting light from the wafer during the scanning. For example, as shown in FIG. 4, the optical subsystem includes light source 408, which may include any suitable light source known in the art.

Light from the light source may be directed to beam splitter 410, which may be configured to direct the light from the light source to wafer 412. The light source may be coupled to any other suitable elements (not shown) such as one or more condensing lenses, collimating lenses, relay lenses, objective lenses, apertures, spectral filters, polarizing components and the like. As shown in FIG. 4, the light may be directed to the wafer at a normal angle of incidence. However, the light may be directed to the wafer at any suitable angle of incidence including near normal and oblique incidence. In addition, the light or multiple light beams may be directed to the wafer at more than one angle of incidence sequentially or simultaneously. The optical subsystem may be configured to scan the light over the wafer in any suitable manner.

Light from wafer 412 may be collected and detected by one or more detectors of the optical subsystem during scanning. For example, light reflected from wafer 412 at angles relatively close to normal (i.e., specularly reflected light when the incidence is normal) may pass through beam splitter 410 to lens 414. Lens 414 may include a refractive optical element as shown in FIG. 4. In addition, lens 414 may include one or more refractive optical elements and/or one or more reflective optical elements. Light collected by lens 414 may be focused to detector 416. Detector 416 may include any suitable detector known in the art such as a charge coupled device (CCD) or another type of imaging detector. Detector 416 is configured to generate output that is responsive to the reflected light collected by lens 414. Therefore, lens 414 and detector 416 form one channel of the optical subsystem. This channel of the optical subsystem may include any other suitable optical components (not shown) known in the art. The output of the detector may include, for example, images, image data, signals, image signals, or any other output that can be generated by a detector suitable for use in a wafer inspection system.

Since the optical subsystem shown in FIG. 4 is configured to detect light specularly reflected from the wafer, the optical subsystem is configured as a bright field (BF) optical subsystem. Such an optical subsystem may, however, also be configured for other types of wafer inspection. For example, the optical subsystem shown in FIG. 4 may also include one or more other channels (not shown). The other channel(s) may include any of the optical components described herein such as a lens and a detector, configured as a scattered light channel. The lens and the detector may be further configured as described herein. In this manner, the optical subsystem may also be configured for dark field (DF) inspection.

The system may use output generated by detector 416 and/or any other detectors included in the optical subsystem to detect the defects on the wafer. For example, the system may also include computer subsystem 418 that is coupled to the optical subsystem. In this manner, output generated by the optical subsystem may be provided to computer subsystem 418. A computer subsystem coupled to the optical subsystem (e.g., computer subsystem 418 described herein) or another computer subsystem (e.g., computer subsystem 400) is configured for, while scanning is being performed, searching the searchable database for patterns in the output. The searching is synchronized with generation of the output for the wafer by the optical subsystem. Searching the database may be further performed as described herein. One or more of these computer subsystems is also configured for determining values for different portions of the output as the values assigned to the different portions of the design having the patterns that substantially match the patterns in the output, which may be performed as described further herein. In addition, one or more of these computer subsystems is configured for detecting defects on the wafer by applying one or more defect detection algorithms to the output based on the values assigned to the different portions of the output, which may be performed as described further herein. In addition, computer subsystems 400 and/or 418 may be configured to perform any other steps described herein.

The computer subsystem of the inspection system may also be coupled to the other computer subsystem that is not part of the inspection system such as computer subsystem 400, which may be included in another tool such as the EDA tool described above such that computer subsystem 418 can receive output generated by computer subsystem 400, which may include the searchable database created for the wafer being inspected. For example, the two computer subsystems may be effectively coupled by a shared computer-readable storage medium such as a fab database or may be coupled by a transmission medium such as that described above such that information may be transmitted between the two computer subsystems.

It is noted that FIG. 4 is provided herein to generally illustrate a configuration of an optical subsystem that may be included in the system embodiments described herein. Obviously, the optical subsystem configuration described herein may be altered to optimize the performance of the optical subsystem as is normally performed when designing a commercial inspection system. In addition, the systems described herein may be implemented using an existing inspection subsystem (e.g., by adding functionality described herein to an existing inspection system) such as the 29xx/28xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system. Furthermore, although the system is described herein as being an optical or light-based inspection system, the optical subsystem may be replaced with an electron beam based subsystem. The electron beam based subsystem may be any suitable electron beam based subsystem included in any suitable commercially available electron beam inspection system.

Further modifications and alternative embodiments of various aspects of the invention will be apparent to those skilled in the art in view of this description. For example, methods and systems for detecting defects on wafers are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for detecting defects on a wafer, comprising:
creating a database for a design for a wafer, wherein said creating comprises assigning values to different portions of the design based on patterns in the different portions of the design and storing the assigned values in the database, and wherein the different portions of the design having substantially the same patterns are assigned the same values in the database;
scanning the wafer with a wafer inspection system, wherein one or more detectors of the wafer inspection system generate output for the wafer during the scanning,
while the scanning is being performed, searching the database for patterns in the output, wherein the searching is synchronized with generation of the output for the wafer by the wafer inspection system;
determining values for different portions of the output as the values assigned to the different portions of the design having the patterns that substantially match the patterns in the output, and
detecting defects on the wafer by applying one or more defect detection algorithms to the output based on the values assigned to the different portions of the output, wherein creating the database, searching the database, determining the values, and detecting the defects are performed with one or more computer systems, and wherein applying the one or more defect detection algorithms comprises:
determining a statistic for the different portions of the output;
detecting defects in the different portions of the output based on the statistics and for one of the different portions of the output in which one of the defects was detected:
generating a first comparing result by comparing the statistic for the one different portion to the statistics for one or more of the different portions of the output generated within the same die as the one different portion and having the same assigned values as the one different portion;
generating a second comparing result by comparing the statistic for the one different portion to the statistics for one or more other of the different portions of the output generated in one or more dies other than the die in which the one different portion was generated and having the same assigned values as the one different portion; and
determining a defect type for the one of the defects based on the first and second comparing results in combination.

2. The method of claim 1, wherein creating the database comprises applying a geometric hashing method to the design.

3. A non-transitory computer-readable medium, storing program instructions executable on a computer system for performing a computer-implemented method for detecting defects on a wafer, wherein the computer-implemented method comprises:
creating a database for a design for a wafer, wherein said creating comprises assigning values to different portions of the design based on patterns in the different portions of the design and storing the assigned values in the database, and wherein the different portions of the design having substantially the same patterns are assigned the same values in the database;
scanning the wafer with a wafer inspection system, wherein one or more detectors of the wafer inspection system generate output for the wafer during the scanning,
while the scanning is being performed, searching the database for patterns in the output, wherein the searching is synchronized with generation of the output for the wafer by the wafer inspection system;
determining values for different portions of the output as the values assigned to the different portions of the design having the patterns that substantially match the patterns in the output, and
detecting defects on the wafer by applying one or more defect detection algorithms to the output based on the values assigned to the different portions of the output, wherein applying the one or more defect detection algorithms comprises:
determining a statistic for the different portions of the output;
detecting defects in the different portions of the output based on the statistics; and
for one of the different portions of the output in which one of the defects was detected;
generating a first comparing result by comparing the statistic for the one different portion to the statistics for one or more of the different portions of the output generated within the same die as the one different portion and having the same assigned values as the one different portion;
generating a second comparing result by comparing the statistic for the one different portion to the statistics for one or more other of the different portions of the output generated in one or more dies other than the die in which the one different portion was generated and having the same assigned values as the one different portion; and
determining a defect type for the one of the defects based on the first and second comparing results in combination.

4. A non-transitory computer-readable medium, storing program instructions executable on a computer system for performing a computer-implemented method for detecting defects on a wafer, wherein the computer-implemented method comprises:
creating a database for a design for a wafer, wherein said creating comprises assigning values to different portions of the design based on patterns in the different portions of the design and storing the assigned values in the database, and wherein the different portions of the design having substantially the same patterns are assigned the same values in the database;
scanning the wafer with a wafer inspection system, wherein one or more detectors of the wafer inspection system generate output for the wafer during the scanning;
while the scanning is being performed, searching the database for patterns in the output, wherein the searching is synchronized with generation of the output for the wafer by the wafer inspection system;
determining values for different portions of the output as the values assigned to the different portions of the design having the patterns that substantially match the patterns in the output; and detecting defects on the wafer by applying one or more defect detection algorithms to the output based on the values assigned to the different portions of the output, and wherein applying the one or more defect detection algorithms comprises:
comparing the output generated at corresponding locations in different dies;
identifying candidate defects based on results of the comparing; and
for one of the candidate defects:
determining a detection confidence based on two or more of the different portions of the output having the same assigned values as the different portion of the output in which the one candidate defect was detected;
rejecting or accepting the one candidate defect as an actual defect based on the detection confidence; and
altering one or more parameters of scanning the wafer and detecting the defects based on whether the one candidate defect is rejected or accepted.

5. The method of claim 1, wherein applying the one or more defect detection algorithms further comprises determining a value for a first characteristic of one of the defects based on the different portions of the output generated within a single die on the wafer and a value for a second characteristic of the one defect based on the different portions of the output generated in different dies on the wafer and determining if the one defect is a process variation defect, random defect, or systematic defect based on the values for the first and second characteristics.

6. The method of claim 1, wherein applying the one or more defect detection algorithms further comprises determining an additional statistic for the defects detected in the different portions of the output having one of the assigned values and determining if the defects are systematic defects based on the additional statistic.

7. The method of claim 1, wherein assigning the values comprises assigning predetermined values to the different portions of the design in which process variation is substantially higher than other portions of the design, and wherein applying the one or more defect detection algorithms further comprises applying the one or more defect detection algorithms to only the different portions of the output to which the predetermined values have not been assigned.

8. The method of claim 1, wherein assigning the values comprises assigning predetermined values to the different portions of the design in which process variation is substantially higher than other portions of the design, and wherein scanning the wafer comprises scanning only portions of the wafer corresponding to the different portions of the design to which the predetermined values have not been assigned.

9. The method of claim 1, wherein assigning the values comprises scanning the wafer or another wafer in a recipe setup scan performed with the water inspection system to generate additional output for the wafer or the other wafer with the one or more detectors of the wafer inspection system, determining values for different portions of the additional output as the values assigned to the different portions of the design having the patterns that substantially match the patterns in the additional output, and associating noise levels in the different portions of the additional output with the values of the different portions of the design assigned to the different portions of the additional output.

10. The method of claim 9, further comprising determining care areas for the wafer based on the noise levels associated with the values of the different portions of the design.

11. The method of claim 1, further comprising determining one or more characteristics of defects detected in the different portions of the design having the same values.

12. The method of claim 1, wherein applying the one or more defect detection algorithms further comprises:
comparing the output generated at corresponding locations in different dies;
identifying candidate defects based on results of the comparing; and
for one of the candidate defects:
determining a detection confidence based on two or more of the different portions of the output having the same assigned values as the different portion of the output in which the one candidate defect was detected;
rejecting or accepting the one candidate defect as an actual defect based on the detection confidence; and
altering one or more parameters of scanning the wafer and detecting the defects based on whether the one candidate defect is rejected or accepted.

13. The method of claim 1, further comprising generating inspection results for the wafer by associating and storing the assigned values for the different portions of the output in which the defects were detected with information for the defects.

14. The method of claim 1, wherein the values assigned to the different portions of the design indicate if the patterns in the different portions are patterns of interest.

15. The method of claim 14, further comprising altering one or more parameters of scanning the wafer, detecting the defects or a defect review process performed for the defects detected on the wafer based on if the values assigned to the different portions of the design indicate that the patterns in the different portions are the patterns of interest.

16. The method of claim 1, further comprising determining if the defects detected in the different portions of the design having one of the assigned values are systematic defects and, if the defects are determined to be the systematic defects, designating the patterns in the different portions of the design having the one of the assigned values as patterns of interest.

17. The method of claim 16, further comprising altering one or more parameters of scanning the wafer, detecting the defects, or a defect review process performed for the defects detected on the wafer based on whether the different portions of the design having the one of the assigned values are designated as the patterns of interest.

18. The method of claim 1, further comprising determining a noise measure for at least one area on the wafer using the output for two or more areas on the wafer having substantially the same patterns formed therein.

19. The method of claim 18, wherein the at least one area and the two or more areas are located in the same die on the wafer at different within die locations.

20. The method of claim 18, further comprising determining a non-defect related characteristic of the wafer based on the determined noise measure.

21. The method of claim 1, wherein the wafer inspection system is a virtual wafer inspection system.

22. The method of claim 21, further comprising querying the virtual wafer inspection system for the output stored in the virtual wafer inspection system at pattern of interest locations on the wafer and applying one or more algorithms to the output resulting from the querying.

23. The method of claim 1, further comprising, while the scanning is being performed, storing the output in a virtual wafer inspection system, wherein the output used for the searching step is the output stored in the virtual wafer inspection system.

24. The method of claim 23, further comprising, while the scanning is being performed, detecting defects on the wafer by applying one or more other defect detection algorithms to the output as the output is stored in the virtual wafer inspection system.

25. The method of claim 1, further comprising, while the scanning is being performed, storing the output in a virtual wafer inspection system, querying the virtual wafer inspection system for the output stored in the virtual wafer inspection system at pattern of interest locations on the wafer, and applying one or more algorithms to the output resulting from the querying.

26. A system configured to detect defects on a wafer, comprising:
one or more computer subsystems configured for creating a database for a design for a wafer, wherein said creating comprises assigning values to different portions of the design based on patterns in the different portions of the design and storing the assigned values in the database, and wherein the different portions of the design having substantially the same patterns are assigned the same values in the database; and
an optical subsystem configured for scanning the wafer, wherein one or more detectors of the optical subsystem generate output for the wafer during the scanning, and wherein the one or more computer subsystems are further configured for:
while the scanning is being performed, searching the database for patterns in the output, wherein the searching is synchronized with generation of the output for the wafer by the optical subsystem;
determining values for different portions of the output as the values assigned to the different portions of the design having the patterns that substantially match the patterns in the output; and
detecting defects on the wafer by applying one or more defect detection algorithms to the output based on the values assigned to the different portions of the output, wherein applying the one or more defect detection algorithms comprises:
determining a statistic for the different of the output;
detecting defects in the different portions of the output based on the statistics; and
for one of the different portions of the output in which one of the defects was detected;
generating a first comparing result by comparing the statistic for the one different portion to the statistics for one or more of the different portions of the output generated within the same die as the one different portion and having the same assigned values as the one different portion;
generating a second comparing result by comparing the statistic for the one different portion to the statistics for one or more other of the different portions of the output generated in one or more dies other than the die in which the one different portion was generated and having the same assigned values as the one different portion; and
determining a defect type for the one of the defects based on the first and second comparing results in combination.

27. The system of claim 26, wherein creating the database comprises applying a geometric hashing method to the design.

28. The system of claim 26, wherein applying the one or more defect detection algorithms further comprises determining a value for a first characteristic of one of the defects based on the different portions of the output generated within a single die on the wafer and a value for a second characteristic of the one defect based on the different portions of the output generated in different dies on the wafer and determining if the one defect is a process variation defect, random defect, or systematic defect based on the values for the first and second characteristics.

29. The system of claim 26, wherein applying the one or more defect detection algorithms further comprises determining an additional statistic for the defects detected in the different portions of the output having one of the assigned values and determining if the defects are systematic defects based on the additional statistic.

30. The system of claim 26, wherein assigning the values comprises assigning predetermined values to the different portions of the design in which process variation is substantially higher than other portions of the design, and wherein applying the one or more defect detection algorithms further comprises applying the one or more defect detection algorithms to only the different portions of the output to which the predetermined values have not been assigned.

31. The system of claim 26, wherein assigning the values comprises assigning predetermined values to the different portions of the design in which process variation is substantially higher than other portions of the design, and wherein scanning the wafer comprises scanning only portions of the wafer corresponding to the different portions of the design to which the predetermined values have not been assigned.

32. The system of claim 26, wherein assigning the values comprises scanning the wafer or another wafer in a recipe setup scan performed with the optical subsystem to generate additional output for the wafer or the other wafer with the one or more detectors of the optical subsystem, determining values for different portions of the additional output as the values assigned to the different portions of the design having the patterns that substantially match the patterns in the additional output, and associating noise levels in the different portions of the additional output with the values of the different portions of the design assigned to the different portions of the additional output.

33. The system of claim 32, wherein the one or more computer subsystems are further configured for determining care areas for the wafer based on the noise levels associated with the values of the different portions of the design.

34. The system of claim 26, wherein the one or more computer subsystems are further configured for determining one or more characteristics of defects detected in the different portions of the design having the same values.

35. The system of claim 26, wherein applying the one or more detect detection algorithms further comprises:
comparing the output generated at corresponding locations in different dies;
identifying candidate defects based on results of the comparing; and
for one of the candidate defects:
determining a detection confidence based on two or more of the different portions of the output having the same assigned values as the different portion of the output in which the one candidate defect was detected;

rejecting or accepting the one candidate defect as an actual defect based on the detection confidence; and altering one or more parameters of scanning the wafer and detecting the defects based on whether the one candidate defect is rejected or accepted.

36. The system of claim 26, wherein the one or more computer subsystems are further configured for generating inspection results for the wafer by associating and storing the assigned values for the different portions of the output in which the defects were detected with information for the defects.

37. The system of claim 26, wherein the values assigned to the different portions of the design indicate if the patterns in the different portions are patterns of interest.

38. The system of claim 37, wherein the one or more computer subsystems are further configured for altering one or more parameters of scanning the wafer, detecting the defects, or a defect review process performed for the defects detected on the wafer based on if the values assigned to the different portions of the design indicate that the patterns in the different portions are the patterns of interest.

39. The system of claim 26, wherein the one or more computer subsystems are further configured for determining if the defects detected in the different portions of the design having one of the assigned values are systematic detects and, if the defects are determined to be the systematic defects, designating the patterns in the different portions of the design having the one of the assigned values as patterns of interest.

40. The system of claim 39, wherein the one or more computer subsystems are further configured for altering one or more parameters of scanning the wafer, detecting the defects, or a defect review process performed for the defects detected on the wafer based on whether the different portions of the design having the one of the assigned values are designated as the patterns of interest.

41. The system of claim 26, wherein the one or more computer subsystems are further configured for determining a noise measure for at least one area on the wafer using the output for two or more areas on the wafer having substantially the same patterns formed therein.

42. The system of claim 41, wherein the at least one area and the two or more areas are located in the same die on the wafer at different within die locations.

43. The system of claim 41, wherein the one or more computer subsystems are further configured for determining a non-defect related characteristic of the wafer based on the determined noise measure.

44. The system of claim 26, wherein the one or more computer subsystems are coupled to a virtual wafer inspection system.

45. The system of claim 44, wherein the one or more computer subsystems are further configured for querying the virtual wafer inspection system for the output stored in the virtual wafer inspection system at pattern of interest locations on the wafer and applying one or more algorithms to the output resulting from the querying.

46. The system of claim 26, wherein the one or more computer subsystems are further configured for, while the scanning is being performed, storing the output in a virtual wafer inspection system, and wherein the output used for the searching step is the output stored in the virtual wafer inspection system.

47. The system of claim 46, wherein the one or more computer subsystems are further configured for, while the scanning is being performed, detecting defects on the wafer by applying one or more other defect detection algorithms to the output as the output is stored in the virtual wafer inspection system.

48. The system of claim 26, wherein the one or more computer subsystems are further configured for, while the scanning is being performed, storing the output in a virtual wafer inspection system, querying the virtual wafer inspection system for the output stored in the virtual wafer inspection system at pattern of interest locations on the wafer, and applying one or more algorithms to the output resulting from the querying.

49. A method for detecting defects on a water, comprising:
creating a database for a design for a wafer, wherein said creating comprises assigning values to different portions of the design based on patterns in the different portions of the design and storing the assigned values in the database, and wherein the different portions of the design having substantially the same patterns are assigned the same values in the database;

scanning the wafer with a wafer inspection system, wherein one or more detectors of the wafer inspection system generate output for the wafer during the scanning;

while the scanning is being performed, searching the database for patterns in the output, wherein the searching is synchronized with generation of the output for the wafer by the wafer inspection system;

determining values for different portions of the output as the values assigned to the different portions of the design having the patterns that substantially match the patterns in the output; and detecting defects on the wafer by applying one or more defect detection algorithms to the output based on the values assigned to the different portions of the output, wherein creating the database, searching the database, determining the values, and detecting the defects are performed with one or more computer systems, and wherein applying the one or more defect detection algorithms comprises:

comparing the output generated at corresponding locations in different dies;

identifying candidate defects based on results of the comparing; and for one of the candidate defects:
determining a detection confidence based on two or more of the different portions of the output having the same assigned values as the different portion of the output in which the one candidate defect was detected;

rejecting or accepting the one candidate defect as an actual defect based on the detection confidence; and altering one or more parameters of scanning the wafer and detecting the defects based on whether the one candidate defect is rejected or accepted.

50. The method of claim 49, wherein creating the database comprises applying a geometric hashing method to the design.

51. The method of claim 49, wherein applying the one or more defect detection algorithms further comprises performing statistical analysis on the different portions of the output having the same assigned values.

52. The method of claim 49, wherein applying the one or more defect detection algorithms further comprises determining a value for a first characteristic of one of the defects based on the different portions of the output generated within a single die on the wafer and a value for a second characteristic of the one defect based on the different portions of the output generated in different dies on the wafer and determining if the one defect is a process variation defect, random defect, or systematic defect based on the values for the first and second characteristics.

53. The method of claim 49, wherein applying the one or more defect detection algorithms further comprises determining a statistic for the defects detected in the different portions of the output having one of the assigned values and determining if the defects are systematic defects based on the statistic.

54. The method of claim 49, wherein assigning the values comprises assigning predetermined values to the different portions of the design in which process variation is substantially higher than other portions of the design, and wherein applying the one or more defect detection algorithms further comprises applying the one or more defect detection algorithms to only the different portions of the output to which the predetermined values have not been assigned.

55. The method of claim 49, wherein assigning the values comprises assigning predetermined values to the different portions of the design in which process variation is substantially higher than other portions of the design, and wherein scanning the wafer comprises scanning only portions of the wafer corresponding to the different portions of the design to which the predetermined values have not been assigned.

56. The method of claim 49, wherein assigning the values comprises scanning the wafer or another wafer in a recipe setup scan performed with the wafer inspection system to generate additional output for the wafer or the other wafer with the one or more detectors of the wafer inspection system, determining values for different portions of the additional output as the values assigned to the different portions of the design having the patterns that substantially match the patterns in the additional output, and associating noise levels in the different portions of the additional output with the values of the different portions of the design assigned to the different portions of the additional output.

57. The method of claim 56, further comprising determining care areas for the wafer based on the noise levels associated with the values of the different portions of the design.

58. The method of claim 49, further comprising determining one or more characteristics of defects detected in the different portions of the design having the same values.

59. The method of claim 49, further comprising generating inspection results for the wafer by associating and storing the assigned values for the different portions of the output in which the defects were detected with information for the defects.

60. The method of claim 49, wherein the values assigned to the different portions of the design indicate if the patterns in the different portions are patterns of interest.

61. The method of claim 60, further comprising altering one or more parameters of scanning the wafer, detecting the defects, or a defect review process performed for the defects detected on the wafer based on if the values assigned to the different portions of the design indicate that the patterns in the different portions are the patterns of interest.

62. The method of claim 49, further comprising determining if the defects detected in the different portions of the design having one of the assigned values are systematic defects and, if the defects are determined to be the systematic defects, designating the patterns in the different portions of the design having the one of the assigned values as patterns of interest.

63. The method of claim 62, further comprising altering one or more parameters of scanning the wafer, detecting the defects, or a defect review process performed for the defects detected on the wafer based on whether the different portions of the design having the one of the assigned values are designated as the patterns of interest.

64. The method of claim 49, further comprising determining a noise measure for at least one area on the wafer using the output for two or more areas on the wafer having substantially the same patterns formed therein.

65. The method of claim 64, wherein the at least one area and the two or more areas are located in the same die on the wafer at different within die locations.

66. The method of claim 64, further comprising determining a non-defect related characteristic of the wafer based on the determined noise measure.

67. The method of claim 49, wherein the wafer inspection system is a virtual wafer inspection system.

68. The method of claim 67, further comprising querying the virtual wafer inspection system for the output stored in the virtual wafer inspection system at pattern of interest locations on the wafer and applying one or more algorithms to the output resulting from the querying.

69. The method of claim 49, further comprising, while the scanning is being performed, storing the output in a virtual wafer inspection system, wherein the output used for the searching step is the output stored in the virtual wafer inspection system.

70. The method of claim 69, further comprising, while the scanning is being performed, detecting defects on the wafer by applying one or more other detect detection algorithms to the output as the output is stored in the virtual wafer inspection system.

71. The method of claim 49, further comprising, while the scanning is being performed, storing the output in a virtual wafer inspection system, querying the virtual wafer inspection system for the output stored in the virtual wafer inspection system at pattern of interest locations on the wafer, and applying one or more algorithms to the output resulting from the querying.

72. A system configured to detect defects on a wafer, comprising:
  one or more computer subsystems configured for creating a database for a design for a wafer, wherein said creating comprises assigning values to different portions of the design based on patterns in the different portions of the design and storing the assigned values in the database, and wherein the different portions of the design having substantially the same patterns are assigned the same values in the database; and
  an optical subsystem configured for scanning the wafer, wherein one or more detectors of the optical subsystem generate output for the wafer during the scanning, and wherein the one or more computer subsystems are further configured for:
    while the scanning is being performed, searching the database for patterns in the output, wherein the searching is synchronized with generation of the output for the wafer by the optical subsystem;
    determining values for different portions of the output as the values assigned to the different portions of the design having the patterns that substantially match the patterns in the output; and
    detecting defects on the wafer by applying one or more defect detection algorithms to the output based on the values assigned to the different portions of the output, and wherein applying the one or more defect detection algorithms comprises:
      comparing the output generated at corresponding locations in different dies;

identifying candidate defects based on results of the comparing; and for one of the candidate defects:

determining a detection confidence based on two or more of the different portions of the output having the same assigned values as the different portion of the output in which the one candidate defect was detected;

rejecting or accepting the one candidate defect as an actual defect based on the detection confidence; and altering one or more parameters of scanning the wafer and detecting the defects based on whether the one candidate defect is rejected or accepted.

73. The system of claim 72, wherein creating the database comprises applying a geometric hashing method to the design.

74. The system of claim 72, wherein applying the one or more defect detection algorithms further comprises performing statistical analysis on the different portions of the output having the same assigned values.

75. The system of claim 72, wherein applying the one or more defect detection algorithms further comprises determining a value for a first characteristic of one of the defects based on the different portions of the output generated within a single die on the wafer and a value for a second characteristic of the one defect based on the different portions of the output generated in different dies on the wafer and determining if the one defect is a process variation defect, random defect, or systematic defect based on the values for the first and second characteristics.

76. The system of claim 72, wherein applying the one or more defect detection algorithms further comprises determining a statistic for the defects detected in the different portions of the output having one of the assigned values and determining if the defects are systematic defects based on the statistic.

77. The system of claim 72, wherein assigning the values comprises assigning predetermined values to the different portions of the design in which process variation is substantially higher than other portions of the design, and wherein applying the one or more defect detection algorithms further comprises applying the one or more defect detection algorithms to only the different portions of the output to which the predetermined values have not been assigned.

78. The system of claim 72, wherein assigning the values comprises assigning predetermined values to the different portions of the design in which process variation is substantially higher than other portions of the design, and wherein scanning the wafer comprises scanning only portions of the wafer corresponding to the different portions of the design to which the predetermined values have not been assigned.

79. The system of claim 72, wherein assigning the values comprises scanning the wafer or another wafer in a recipe setup scan performed with the optical subsystem to generate additional output for the wafer or the other wafer with the one or more detectors of the optical subsystem, determining values for different portions of the additional output as the values assigned to the different portions of the design having the patterns that substantially match the patterns in the additional output, and associating noise levels in the different portions of the additional output with the values of the different portions of the design assigned to the different portions of the additional output.

80. The system of claim 79, wherein the one or more computer subsystems are further configured for determining care areas for the water based on the noise levels associated with the values of the different portions of the design.

81. The system of claim 72, wherein the one or more computer subsystems are further configured for determining one or more characteristics of defects detected in the different portions of the design having the same values.

82. The system of claim 72, wherein the one or more computer subsystems are further configured for generating inspection results for the wafer by associating and storing the assigned values for the different portions of the output in which the defects were detected with information for the defects.

83. The system of claim 72, wherein the values assigned to the different portions of the design indicate if the patterns in the different portions are patterns of interest.

84. The system of claim 83, wherein the one or more computer subsystems are further configured for altering one or more parameters of scanning the wafer, detecting the defects, or a defect review process performed for the defects detected on the wafer based on if the values assigned to the different portions of the design indicate that the patterns in the different portions are the patterns of interest.

85. The system of claim 72, wherein the one or more computer subsystems are further configured for determining if the defects detected in the different portions of the design having one of the assigned values are systematic defects and, if the defects are determined to be the systematic defects, designating the patterns in the different portions of the design having the one of the assigned values as patterns of interest.

86. The system of claim 85, wherein the one or more computer subsystems are further configured for altering one or more parameters of scanning the water, detecting the defects, or a defect review process performed for the defects detected on the wafer based on whether the different portions of the design having the one of the assigned values are designated as the patterns of interest.

87. The system of claim 72, wherein the one or more computer subsystems are further configured for determining a noise measure for at least one area on the wafer using the output for two or more areas on the wafer having substantially the same patterns formed therein.

88. The system of claim 87, wherein the at least one area and the two or more areas are located in the same die on the wafer at different within die locations.

89. The system of claim 87, wherein the one or more computer subsystems are further configured for determining a non-detect related characteristic of the wafer based on the determined noise measure.

90. The system of claim 72, wherein the one or more computer subsystems are coupled to a virtual wafer inspection system.

91. The system of claim 90, wherein the one or more computer subsystems are further configured for querying the virtual wafer inspection system for the output stored in the virtual wafer inspection system at pattern of interest locations on the wafer and applying one or more algorithms to the output resulting from the querying.

92. The system of claim 72, wherein the one or more computer subsystems are further configured for, while the scanning is being performed, storing the output in a virtual wafer inspection system, and wherein the output used for the searching step is the output stored in the virtual wafer inspection system.

93. The system of claim 92, wherein the one or more computer subsystems are further configured for, while the scanning is being performed, detecting defects on the wafer by applying one or more other defect detection algorithms to the output as the output is stored in the virtual wafer inspection system.

94. The system of claim 72, wherein the one or more computer subsystems are further configured for, while the scanning is being performed, storing the output in a virtual wafer inspection system, querying the virtual wafer inspection system for the output stored in the virtual wafer inspection system at pattern of interest locations on the wafer, and applying one or more algorithms to the output resulting from the querying.

\* \* \* \* \*